United States Patent [19]

Lunardi et al.

[11] 4,382,741
[45] May 10, 1983

[54] STORAGE PLANT FOR OBJECTS, IN PARTICULAR FOR TRACK LINKS

[75] Inventors: Alceste Lunardi, Rome; Mauro Villani, Bologna; Walter Grilli, Modena, all of Italy

[73] Assignee: Italtractori.T.M. S.p.A., Modena, Italy

[21] Appl. No.: 155,835

[22] Filed: Jun. 2, 1980

[30] Foreign Application Priority Data

Sep. 14, 1979 [IT] Italy .................................. 40103 A/79

[51] Int. Cl.³ .................... B65B 21/02; B65D 87/00
[52] U.S. Cl. ................................. 414/403; 414/281; 414/416; 220/1.5; 53/536
[58] Field of Search .............. 53/536; 414/403, 416, 414/417, 281; 220/1.5

[56] References Cited

U.S. PATENT DOCUMENTS

| | | | |
|---|---|---|---|
| 1,565,984 | 12/1925 | Brockenbrough | 414/331 |
| 1,766,251 | 6/1930 | Greenleaf | 414/331 |
| 2,652,180 | 9/1953 | Fox | 53/536 |
| 2,821,822 | 2/1958 | Mapes | 53/536 |
| 2,825,193 | 3/1958 | Loveridge | 53/536 |
| 2,830,416 | 4/1958 | Edwards et al. | 53/536 |
| 3,005,568 | 10/1961 | Clune et al. | 217/19 X |
| 3,756,436 | 9/1973 | Lingg | 414/417 |
| 3,921,840 | 11/1975 | Julien, Sr. et al. | 414/417 |
| 3,926,323 | 12/1975 | Frank et al. | 414/417 |
| 4,173,289 | 11/1979 | Nesti | 220/1.5 |

FOREIGN PATENT DOCUMENTS

54-12990 1/1979 Japan .................................. 53/536

*Primary Examiner*—Trygve M. Blix
*Assistant Examiner*—R. B. Johnson
*Attorney, Agent, or Firm*—Browdy and Neimark

[57] ABSTRACT

A plant for storing single articles or objects, such as track links, designed to be introduced into a production line turning out the said links, at a point between two consecutive processing center, or units, forming part of the line. A number of special containers, each of which is designed to accommodate the links are formed by rows into 'parcels' and are transferred thus along the line using conventional conveyors thereby permitting their optional withdrawal from and redeposition onto the line. An apparatus is designed to receive, hold and position each single full or empty container with respect to the relative conveyor in order to allow such loading or unloading. Loading or unloading of the single container is brought about by transferring the parcels of links into the container, the base of which is formed with parallel slots into which rollers of a conveyor may be introduced. Each full or empty container may be withdrawn from or deposited onto the apparatus without, causing any hindrance to normal operation.

4 Claims, 9 Drawing Figures

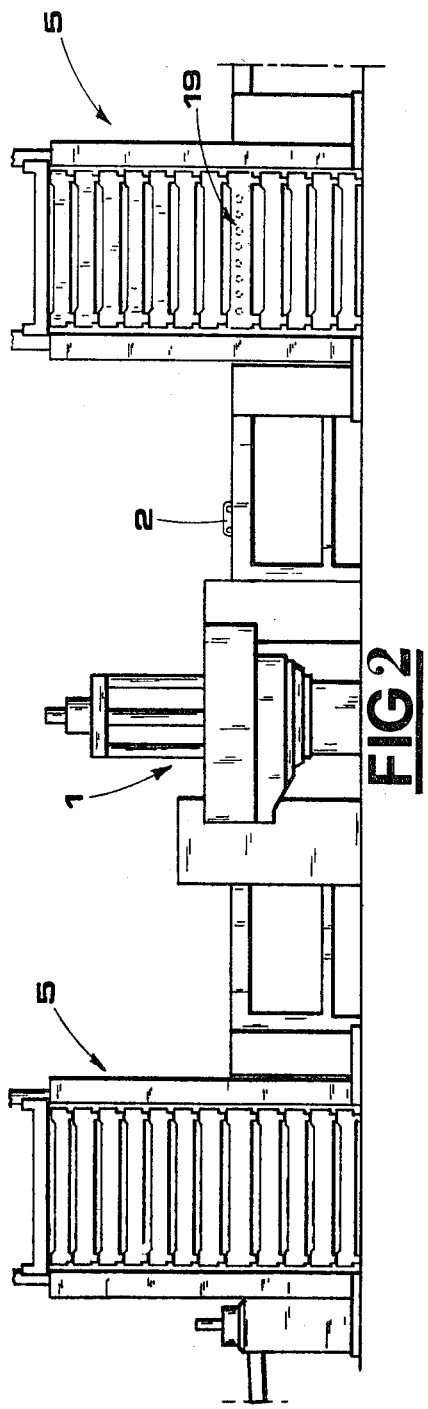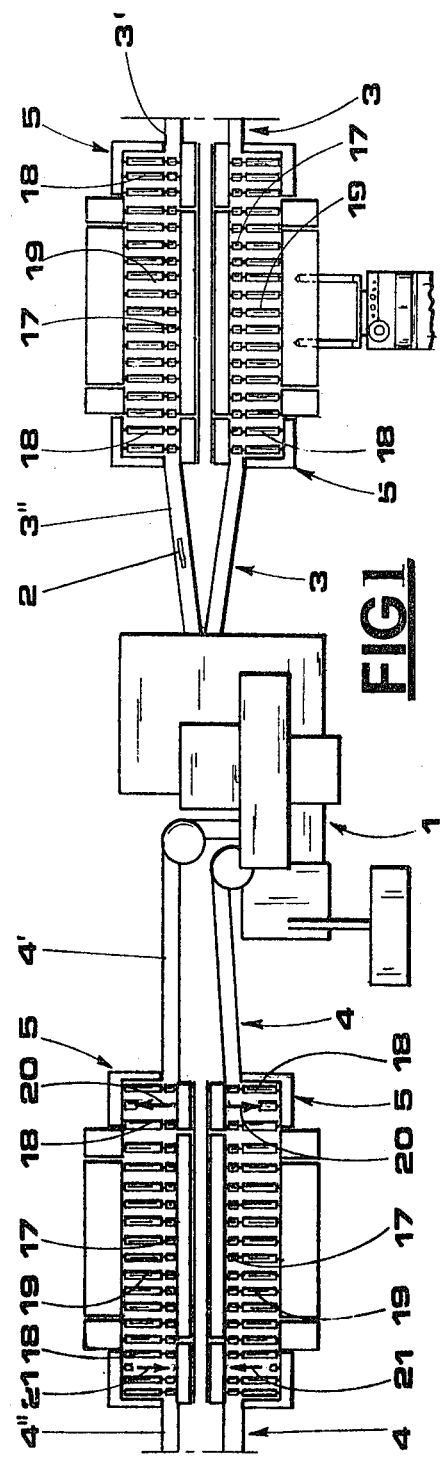

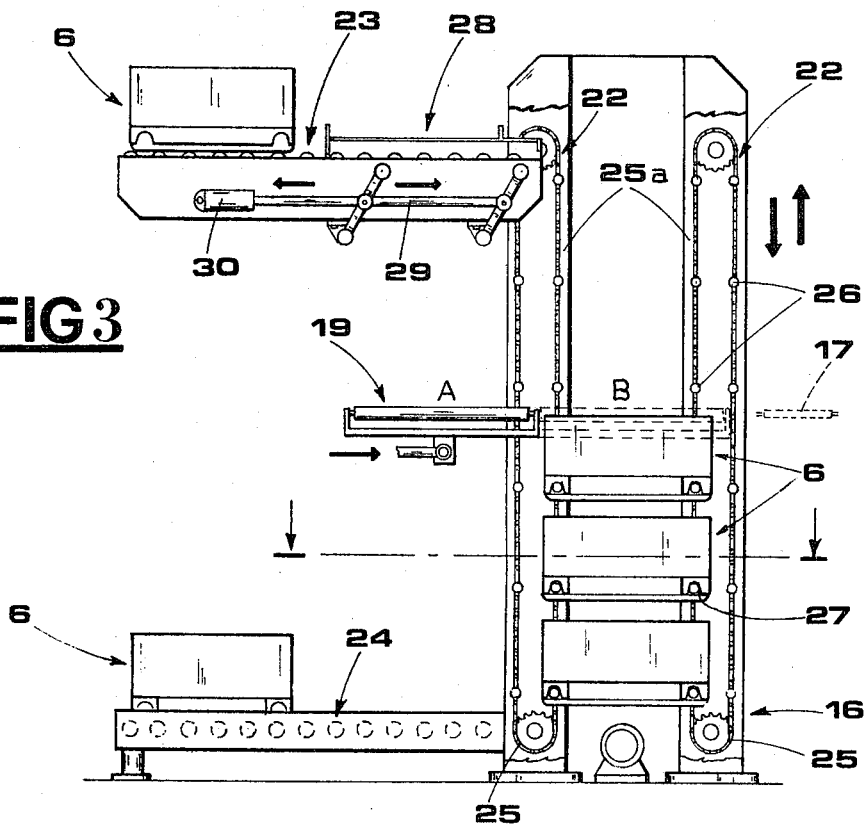

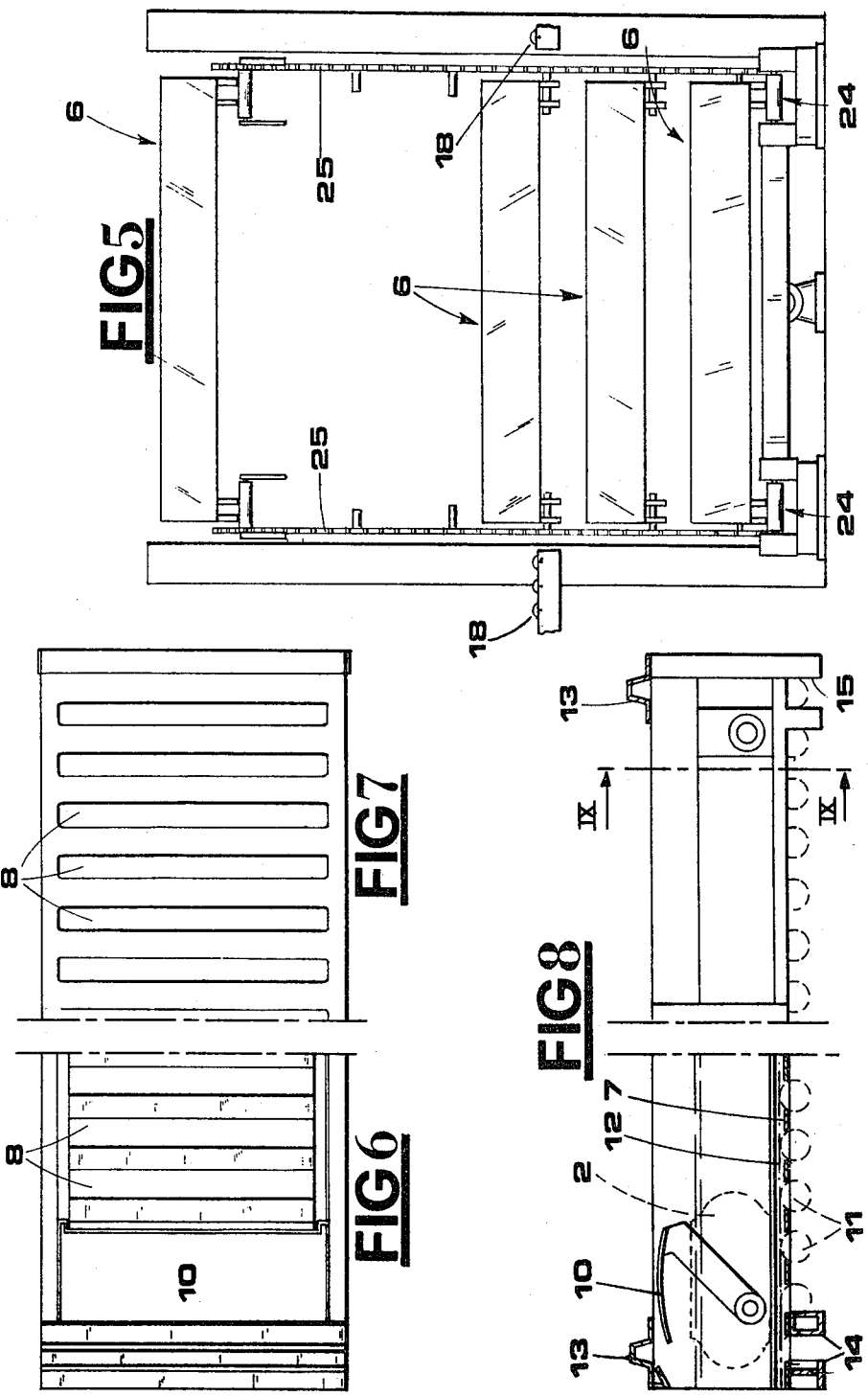

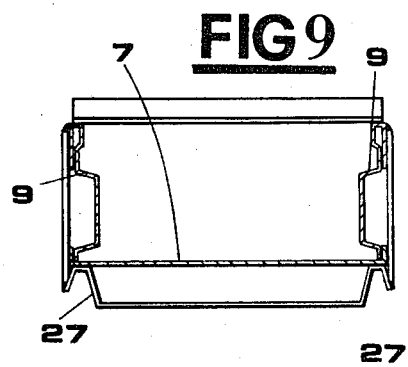

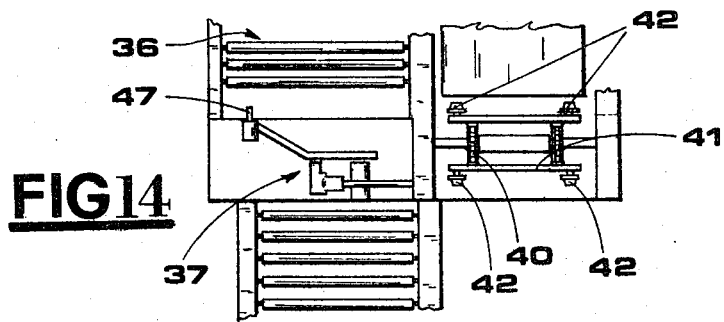
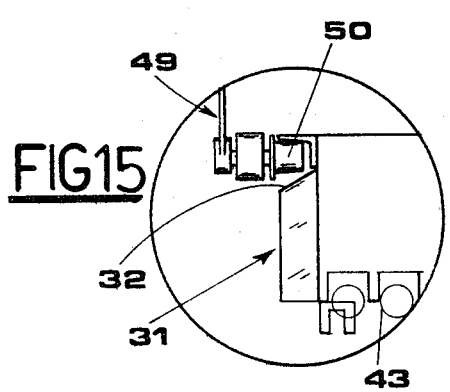
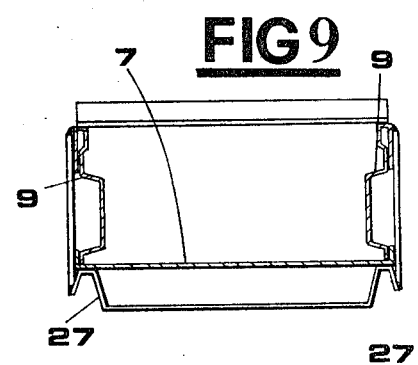
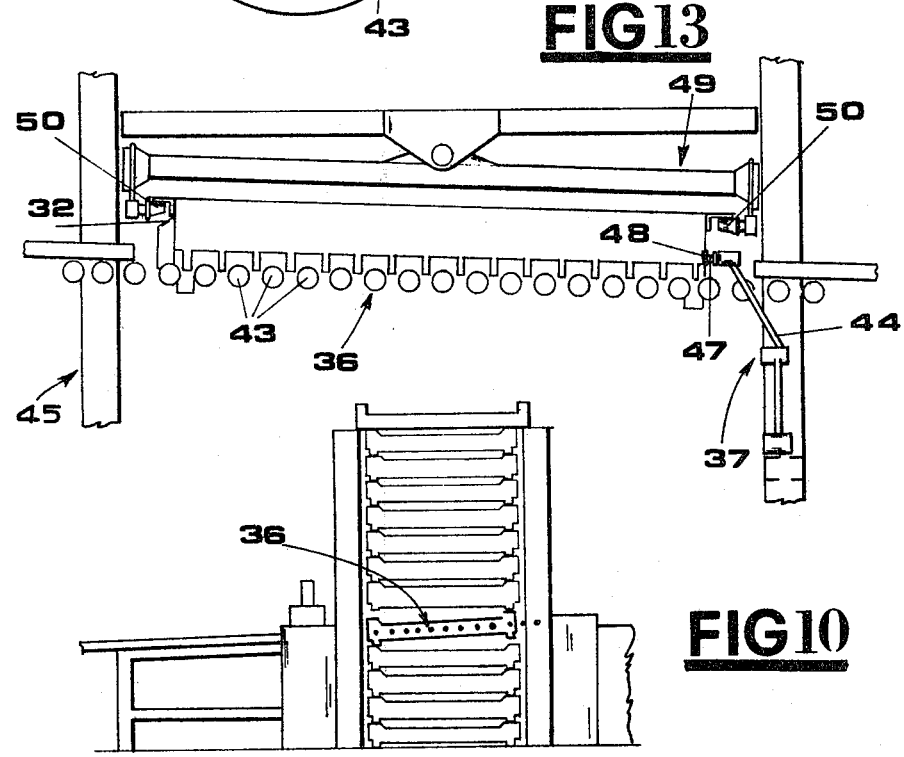

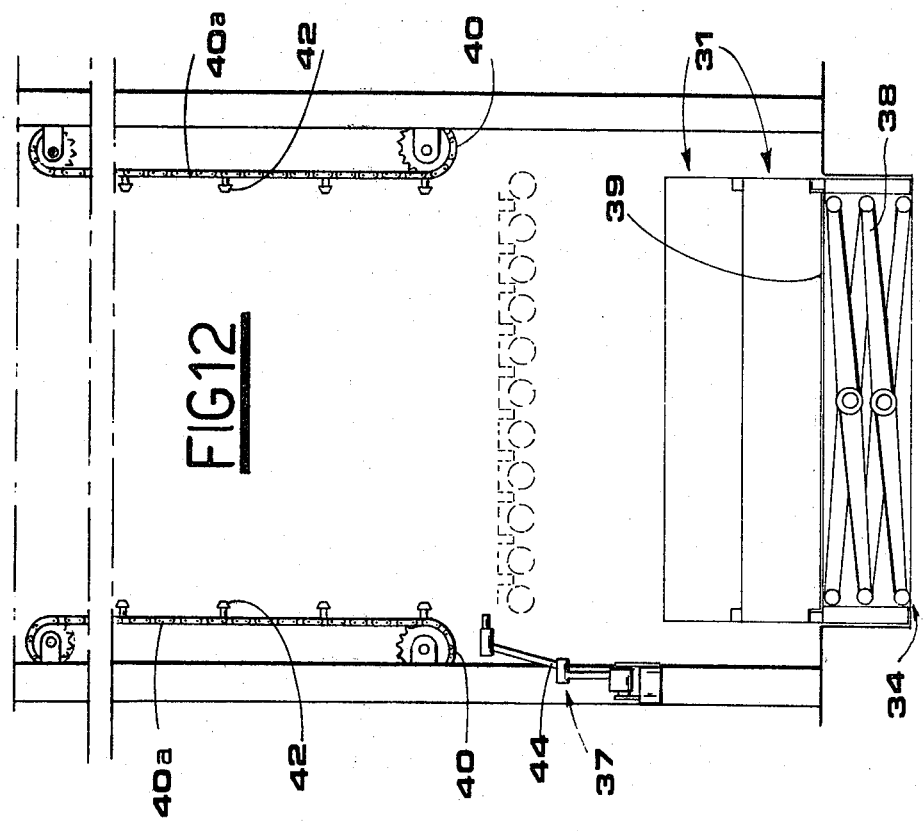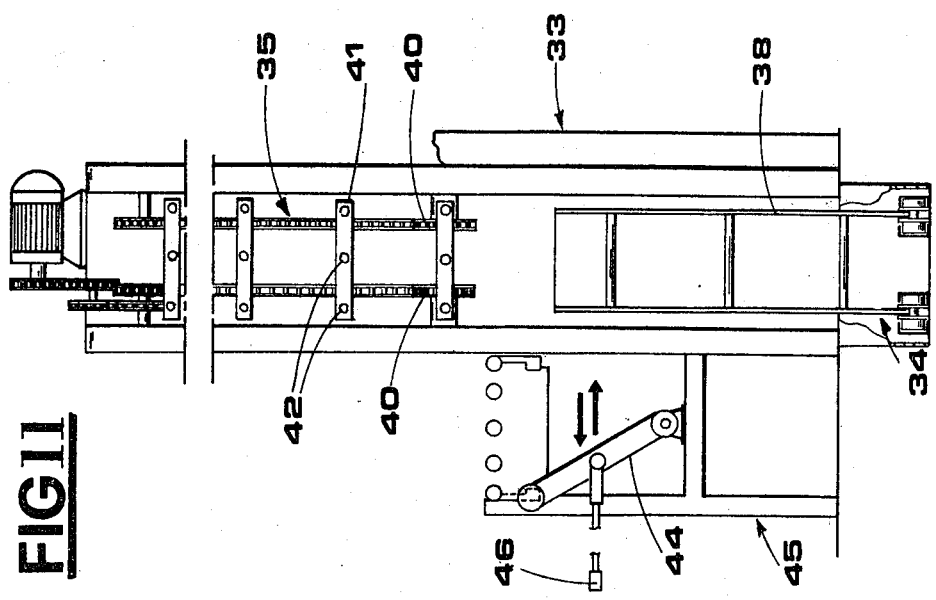

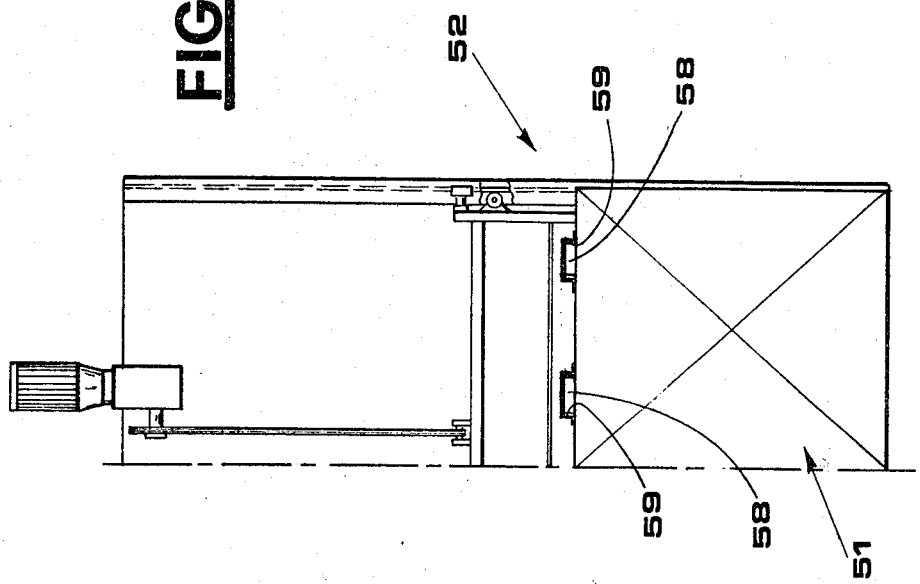
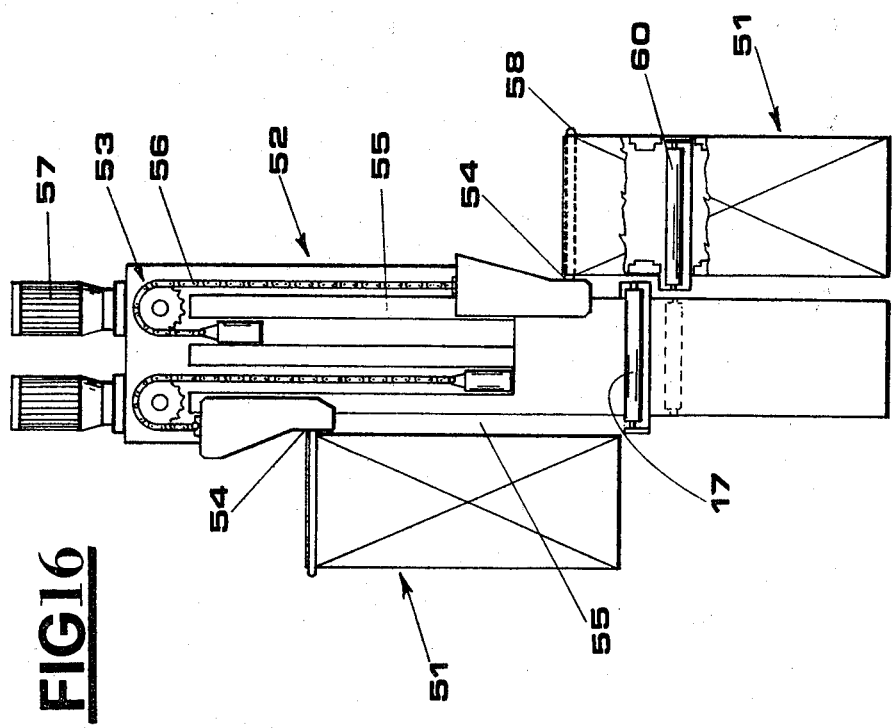

STORAGE PLANT FOR OBJECTS, IN PARTICULAR FOR TRACK LINKS

FIELD OF THE INVENTION

The invention relates to a plant for storing articles or objects such as track links.

BACKGROUND OF THE INVENTION

This invention deals with a storage plant for objects, in particular track links.

One of its specific, but non-exclusive, useful applications is between any two consecutive units or processing center forming part of a line to produce said objects in series. In such lines, in which a very high level of automation is reached, it becomes necessary to have intermediate storage between two consecutive units or centers capable of reducing the close timing of the line linkage, freeing at least part of the production time of a single unit or center with respect to those preceding or following it.

SUMMARY OF THE INVENTION

The purpose of this invention is to provide a satisfactory solution to the abovementioned problem by creating a storage plant for objects, in particular for track links, which is highly automatized and sufficiently versatile.

One advantage of this invention is the possibility of easily inserting or withdrawing objects (links) from the outside by means of ordinary trolleys without affecting normal operation of the apparatus of the invention.

These and other advantages are offered by this invention which deals with a storage plant for objects, in particular for track links, of the type which may be inserted in a line between two consecutive processing units or centers characterized by the fact that it comprises a large number of containers, each suitable to hold said objects neatly arranged in rows, transferred along the line on ordinary conveyor belts, and, if required, allowing said line to be withdrawn and reinserted on conveyor belts, to be sent to a subsequent processing unit or center. Each of said containers comprises at least one rectangular face for said objects containing a large number of identical rectilinear slots, parallel to one another, arrayed across almost the entire width of the container perpendicular to its larger sides, two facing side walls, parallel and symmetrically fixed to said larger sides, and two mobile front walls, symmetrically positioned in correspondence with the two remaining facing sides of said face and all arranged perpendicular to the side walls. The said slots are provided to hold at least part of the conveyor rollers protruding upwards from said face, to form an ideal mobile face for said objects. At least one apparatus is provided to receive, support and position each of said containers full (or empty) on the conveyor belts of said line and to permit each to be loaded with objects coming from the conveyor belt located upstream and the unloading and conveyance of objects inside it onto a conveyor belt located downstream. The said equipment comprises a roller conveyor to connect the upstream conveyor belt with that, which is downstream, two short roller being conveyors located alongside the ends of said roller conveyor and said two short conveyors having more or less the same width as the inside working width of said containers and being spaced at a distance slightly greater than the length of said rectangular face. A roller belt, connects the two said short conveyors, on which one such container is inserted, in such a way that the belt rollers are each included in the slots of the relevant face and protrude upwards from same. Also provided is at least one device to transfer said objects laterally from said roller conveyor and at least one of said short conveyors (upstream) and to arrange said objects neatly in rows to form "parcels". The apparatus includes at least one device to transfer laterally to said roller conveyor one object at a time, which is withdrawn from the relevant "parcel" lying on said downstream short conveyors, said full (or empty) containers each being withdrawn from or inserted from the outside.

BRIEF DESCRIPTION OF THE DRAWINGS

Further features and advantages of this invention will appear from the detailed description which follows of some preferred, but not exclusive, forms of construction, which are illustrated purely by way of example but not limitation, in the attached drawings in which:

FIG. 1 shows a schematic plan diagram of a part of a line in which apparatus according to the invention are inserted between consecutive processing units or centers with various belts and conveyors removed for clarity;

FIG. 2 shows a schematic vertically raised side view of FIG. 1;

FIG. 3 shows an enlarged schematic partly cutaway front view of FIG. 2;

FIG. 4 shows, on the same scale, a partly cutaway plan view of FIG. 3;

FIG. 5 shows, on the same scale, a vertically raised schematic side view of FIG. 3;

FIG. 6 shows an overhead plan view of part of a container forming part of the construction shown in FIG. 1;

FIG. 7 shows an underground plan view of part of the container shown in FIG. 6;

FIG. 8 shows a partly cutaway vertically raised side view of FIG. 6; and

FIG. 9 shows a cutaway section according to plane IX—IX in FIG. 8.

In these figures (1) indicates a processing center for links (2) for tracks forming part of a processing line for these links. The center (1) is connected to the center preceding it and to the one following it in the said line by transport line section (3) and (4), corresponding to each of which two plants (5) are arranged to store the links (2) symmetrically coupled.

In a first form of construction each plant (5) consists of a large number of containers (6), identical and each suitable to hold the links (2), arranged neatly in rows to form "parcels" slightly narrower than said container. Each container (6) comprises: a rectangular face (7) having parallel lesser and greater borders for said links containing a large number of rectilinear slots (8), identical, parallel and arrayed across almost the total width of said face perpendicular to its larger sides; two opposite side walls (9), parallel and symmetrically fixed in correspondence with said larger sides; and two mobile front walls (10) symmetrically arranged in correspondence with the two remaining opposite sides of the face (7) and hinged to said side walls.

The slots (8) are provided to hold at least part of the parallel rollers (11), which protrude above the face (7) to form overall an ideal mobile face (12).

The front walls (10) are arranged perpendicularly to the side walls (9) and in maximum opening position, permit the passage of links (2) supported on the ideal mobile face (12) moving perpendicular to the rollers (11).

In the container (6) "parcels" of links (2) may be inserted, translated longitudinally and then accumulated and withdrawn as required.

Each of these containers has some wedge-protruding elements (13) on the upper side and some supporting elements (14) on the lower side, also protruding and containing seats (15) to hold said wedge elements (13) to allow said containers to be piled one on top of the other.

Said elements are located to correspond to the small container (6) sides, which are inserted in equipment (16) which receives them and positions each of them, so that, if empty, they may be loaded with links (2) coming from a conveyor belt (3') or (4') located upstream from said equipment; or unloading, if full, and the links contained in them sent downstream on a conveyor belt (3'') or (4''). Each equipment (16) includes: a roller conveyor (17) which connects the conveyor belt (3') to the conveyor belt downstream (3''); two short conveyors with motorized rollers (18), located and in tandem at the ends of the conveyor (17), with more or less the same width as the inside working width of the containers (8) and located in parallel alongside the ends of the conveyor (17) spaced at a distance slightly greater than the length of the rectangular faces (7). A roller belt (19) composed of motorized rollers (11) see FIG. 8 connects the two short conveyors (18), on which a single container (6) may be inserted, so that the rollers (11) are each within the slots (8) of the relevant face (7), protruding upwards from same. Each apparatus (16) also includes a device to transfer the single links (2) from the sides of the roller conveyor (17) to the short conveyors (18) and vice versa, as per the routes arrowed (20) and (21); and an elevator device (22) to transfer each container (6) vertically from a loading reel (24) located below and vice versa.

The elevator device (22) is composed of two pairs of identical closed loop chains (25) symmetrically arranged with their vertical facing runs (25a) moving in the same direction in synchronization.

The pairs of chains (25) contain some stakes (26), equidistanced and symmetrically positioned, to be engaged in special seats (27) provided at both smaller container sides (6).

Each container is thus supported by four stakes (26) and transferred vertically by the movement of the chains (25) so that it is always parallel to the roller conveyor (17) and arranged exactly on the vertical of the space between the short conveyors (18).

The roller conveyor (19) can translate horizontally, from a position A outside the chains (25) to a working position B inside them and vise versa. This makes it possible, in position B, to insert a container (6) on the roller conveyor (19) for loading or unloading; in this case, in fact, the roller conveyor (19) connects the short conveyors (18) perfectly, permitting transit of the links (2) to be stored or extracted. A translating device (28), located to correspond to the loading reel (23) transfers single containers (6) from this reel to the peak of the facing branches (25a) and vice versa.

The translating device (28) is synchronized with the movement of the chains (25) by a balanced mechanism (29), controlled by an operator cylinder (30).

The loading reel (23) and unloading reel (24) are each composed of two raceways with motorized rollers provided to hold the supporting elements (14) of the containers (6). This invention functions as follows;

The empty containers (6) are deposited one at a time, by a normal fork truck on the reel (23). As required, they are then transferred from this to the peak of the elevator device (22) and arranged on the stakes (26) facing each other on the chains (25) by means of the translating device (28) which works in synchronism with the vertical motion of said chains.

In the loading phase the chains (25) descend one step after each container has been loaded. This is possible due to the fact that the roller belt (19) is set back from the work position B to the position A for the time required until a new container (6), empty, reaches the position previously occupied by the container which has just been loaded. At this point, the roller belt (19) is made to move forward from position A to position B with the container centered on it so that the rollers (11) protrude upwards from the face (7). The loading of this new container with links (2) is automatic. In fact, the single links (2) coming from the conveyor belts (3') or (4'), on reaching the height of the short roller conveyors (18), are pushed sideways on this in the direction arrowed (20), see FIG. 1, until they form a "parcel", the width of which is slightly less than the internal width of the containers (6).

The "parcel" formed is then transferred by the motorized rollers of the short conveyors (18) and later by those of the roller belt (19) on the ideal face (12) along the entire container.

The operation is repeated until the container (6) is full of links.

At this point, the roller belt (19) is brought to position A and a new container inserted by the chains (25) to replace the previous one. The containers (6) loaded with links are then each deposited on the unloading reel (24) from which they can then be extracted by a fork truck. If links (2) are requested by the processing center (1), after lifting the mobile wall (10), the single "parcels" of links on the container (6) are transferred by the motorized rollers (11) of the belt (19) to the short roller conveyor (18) downstream.

From this a withdrawal device arranges to transfer one link at a time of the single "parcel" from the side, as per the arrow (21), see FIG. 1 to place it on the conveyor (17); from the conveyor (17) the single links (2) are then sent along conveyor belts (3'') to the processing center (1). The containers (6) of the equipment (16) may move in one of two directions, according to immediate needs on the line and empty and loaded containers may be extracted or inserted without interfering with the operation of the line.

When the number of links required in the time unit by the processing center (1) coincides with that reached by two coupled storage plants (5), said equipment start operating and the single links (2) cross the conveyor belt (3'), the conveyor (17) and the conveyor belt (3''), up to the processing center (1).

Obviously, many practical applicative modifications may be made to the construction details of this invention without diverging from the protection ambit of the invention concept as claimed below.

What we claim is:

1. A production line for producing objects comprising a plurality of consecutive processing centers interspersed with a plurality of storage means with each storage means positioned between a pair of consecutive processing centers, the production line further including a plurality of conventional roller conveyors interconnecting said processing centers and said storage means, each said storage means comprising a plurality of containers each accommodating said objects disposed in horizontal rows therein, each of said containers comprising a rectilinear surface upon which said objects rest, said rectilinear surface being defined by a pair of parallel greater borders and a perpendicular pair of parallel lesser borders, said surface being formed with a number of like rectilinear slots each parallel with the next and arrayed across substantially the total width of said surface so as to be disposed perpendicular with respect to said greater borders, said container comprising two parallel, symmetrically opposed and stationary lateral walls located at said greater borders and two symmetrically disposed and movable frontal walls located at said opposed lesser borders of said surface, said slots being adapted to receive at least a portion of the rollers of said conventional conveyors in such a way that said rollers protrude upwardly with respect to said rectilinear surface thereby creating an effectively movable surface upon which said objects may rest, said storage means comprising means to receive, hold and position each single full or empty container with respect to said conventional conveyors in order to allow both loading thereinto of objects withdrawn from a said conventional conveyor positioned upstream of said storage means and unloading and dispatching of objects contained therein on a further conventional conveyor downstream of said storage means, said storage means further comprising a roller conveyor connecting each said upstream conventional conveyor with each said downstream conventional conveyor, two short roller conveyors adjacent the ends of said roller conveyor and parallel thereto, the width of said two short conveyors being substantially equal to the interior width of one of said single containers, said short conveyors being disposed at substantially equal spaced distances slightly greater than that corresponding to the length of said rectilinear surface, a roller transfer conveyor having parallel rollers connecting the two short conveyors upon which a single container may be supported in such a way that said parallel rollers may enter corresponding single ones of said slots located in said rectilinear surface and protrude upwardly with respect thereto, said storage means further including at least one means for effecting lateral transfer of said objects from said roller conveyor to and from said short roller conveyors, thus disposing the objects into rows so as to form 'parcels' of said objects on said short roller conveyors; at least one corresponding withdrawal device for effecting lateral transfer of the said objects, separated singly from a respective 'parcel' lying on a said short conveyor, from said short conveyor back onto said roller conveyor, and said single empty or full containers being capable of being taken from and introduced into said storage means without any hindrance to the normal operation of said production line.

2. A storage means according to claim 1, wherein said containers are furnished with wedge-like protrusions at their upper extremities and are provided at their lower extremities with further protrusions defining slots designed to accommodate said wedge-like protrusions, thus permitting stacking of said containers one on top of the next.

3. A storage means according to claims 1 or 2, wherein said apparatus comprises an elevator for effecting vertical transfer of single containers from a loading rollerway positioned above and perpendicular with respect to said roller transfer conveyor and an unloading rollerway therebelow, single ones of said containers being borne up by said elevator with their greater borders parallel to the said rollerways in such a way as to correspond, at any given movement, with that vertical plane relative to the space existing between the said short roller conveyors and to lie above and/or below the said roller transfer conveyor when the latter assumes operating position; the said roller transfer conveyor being furnished with motorized rollers capable of producing horizontal movement back and forth, along a direction leading to and from said elevator.

4. A storage means according to claim 3, wherein said elevator consists of two pairs of identical and symmetrically disposed closed loop chains, the vertical opposed runs of which are synchronized so as to produce like oriented and geometrically defined movement, said chains being furnished with pins designed to engage appropriate slots located in each single container, and a transfer device to transfer single containers from said loading rollerway to the top of said elevator synchronously with the movement of said chains.

* * * * *